(12) United States Patent
Krantz et al.

(10) Patent No.: US 7,876,735 B2
(45) Date of Patent: Jan. 25, 2011

(54) TRANSMITTING A COMMUNICATION FROM A WIRELESS ACCESS POINT INDICATING AVAILABLE NETWORKS AND THEIR CAPABILITIES

(75) Inventors: Anton W. Krantz, Kirkland, WA (US); Ari Pekka Niikkonen, Redmond, WA (US); Mohammad Shabbir Alam, Redmond, WA (US); Timothy M. Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 635 days.

(21) Appl. No.: 11/193,245

(22) Filed: Jul. 29, 2005

(65) Prior Publication Data

US 2007/0025371 A1    Feb. 1, 2007

(51) Int. Cl.
   *H04W 4/00* (2009.01)
(52) U.S. Cl. .................................. 370/338; 370/328
(58) Field of Classification Search ........................ None
   See application file for complete search history.

(56) References Cited

U.S. PATENT DOCUMENTS

| | | | |
|---|---|---|---|
| 6,966,714 B2 | 11/2005 | Harris et al. | |
| 7,046,647 B2 | 5/2006 | Oba et al. | |
| 7,155,167 B1 | 12/2006 | Carty | |
| 7,269,260 B2 | 9/2007 | Adachi et al. | |
| 7,313,111 B2 | 12/2007 | Hietalahti et al. | |
| 7,359,363 B2 | 4/2008 | Sakai | |
| 7,359,989 B2 | 4/2008 | Orava et al. | |
| 7,366,511 B2 | 4/2008 | Jaakkola et al. | |
| 7,477,746 B2 | 1/2009 | Kang et al. | |
| 7,505,443 B2 | 3/2009 | McNew et al. | |
| 7,505,595 B2 | 3/2009 | Lee et al. | |
| 2003/0158922 A1 | 8/2003 | Park | |
| 2003/0196115 A1 | 10/2003 | Karp | |
| 2004/0023640 A1 | 2/2004 | Ballai | |
| 2004/0066756 A1* | 4/2004 | Ahmavaara et al. | ......... 370/328 |
| 2004/0068653 A1 | 4/2004 | Fascenda | |
| 2004/0077336 A1 | 4/2004 | Lauriol | |
| 2004/0208151 A1 | 10/2004 | Haverinen et al. | |
| 2005/0147073 A1 | 7/2005 | Hietalahti et al. | |
| 2005/0176420 A1* | 8/2005 | Graves et al. | ............... 455/424 |
| 2006/0209773 A1 | 9/2006 | Hundal et al. | |
| 2006/0227972 A1* | 10/2006 | Brok et al. | .................. 380/270 |

* cited by examiner

*Primary Examiner*—Erika A Gary
(74) *Attorney, Agent, or Firm*—Wolf, Greenfield & Sacks, P.C.

(57) ABSTRACT

A wireless access point may be configured to advertise, to mobile user devices, multiple wireless networks available through the wireless access point. For example, service set identifiers (SSIDs) may be specified within an information element (IE) of a communication such as, for example, an 802.11 beacon, broadcasted to mobile user devices. Such an IE may utilize the capability provided by IEEE 802.11 itself to use additional and flexible numbers of information elements within a beacon. Accordingly, networks that would otherwise remain hidden due to limitations of known wireless access points are made visible to mobile user devices. Configuring a wireless access point to advertise multiple available wireless networks, for example, by firmware upgrades, may serve as a viable and cost-effective interim solution and/or alternative to replacing a wireless access point with a wireless access point configured to implement virtual wireless access points.

7 Claims, 7 Drawing Sheets

| Name | Value | Size |
|---|---|---|
| Element ID | 0xDD | 1 |
| Length | Variable | 1 |
| OUI | 00:50:F2 | 3 |
| OUI Type | 05 | 1 |
| Primary SSID Extended Capability | Extended Capability | 1 |
| (Note, following fields are optional) | | |
| SSID-Count | 1–S | 1 |
| --There are SSID-Count Occurrences of the Following Hidden SSID Field(s)-- | | |
| Hidden SSID[1] — SSID Ext Capability | Extended Capability | 1 |
| Hidden SSID[1] — SSID Capability | Capability | 4 |
| Hidden SSID[1] — SSID Name Length | 1–32 | 1 |
| Hidden SSID[1] — SSID Name | | 1–32 |
| ... | | |
| Hidden SSID[S] — SSID Ext Capability | Extended Capability | 1 |
| Hidden SSID[S] — SSID Capability | Capability | 4 |
| Hidden SSID[S] — SSID Name Length | 1–32 | 1 |
| Hidden SSID[S] — SSID Name | | 1–32 |

FIG. 2

TRANSMITTING A COMMUNICATION FROM A WIRELESS ACCESS POINT INDICATING AVAILABLE NETWORKS AND THEIR CAPABILITIES

BACKGROUND

Wireless networks have a growing role in today's world. As used herein, a "network" is a defined group of two or more network elements interconnected by one or more segments of transmission media. One or more of the network elements, which may include network devices, may be configured to transmit and/or receive communications to one or more other network elements over one or more of the segments of transmission media. The network elements that are members of the defined group of the network may change over time, for example, when network elements are added to the network and/or users log on to the network, and when network elements are removed and/or users log off. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two elements connected by a single wire, bus, wireless connection, or other type of segment(s). Further, it should be appreciated that when a network is illustrated in a drawing of this application as being connected to an element in the drawing, the connected element itself is considered part of the network.

As used herein, a "wireless network" is a communications network including one or more network elements that enable wireless communications between two or more network elements of a communications network. Wireless networks often include what are called Public Land Mobile Networks (PLMNs), several types of which are known, including Global System for Mobile communications (GSM), General Packet Radio Service (GPRS), Universal Mobile Telecommunications System (UMTS), a plurality of types of Code-Division Multiple Access-based communications networks (e.g., cdmaOne, cdma2000, etc.), Wireless Personal Area Networks (PANs), for example, Bluetooth or a wireless PAN in accordance with IEEE 802.15, and Wireless Local Area Networks (WLANs), for example, HiperLan 2 or a WLAN in accordance with IEEE 802.11 (e.g., 802.11b (Wi-Fi), 802.11a and 802.11g).

As used herein, a "network device" is a device operative to communicate on a network, including, but not limited to: workstations, personal computers, terminals, laptop computers, end stations, user devices, servers, gateways, registers, switches, routers, hubs, bridges, directories, transmitters, receivers, repeaters, and any combinations thereof. As used herein, a "user device" is a network device from/to which a user may send/receive communications, and which may serve as an endpoint to communications on a communications network. It should be appreciated that a user device may not actually be part of a network at all times. User devices include, but are not limited to: workstations; personal computers (e.g., PCs); laptop computers, notebook computers; telephones (e.g., landline or mobile); pagers; Blackberry™ brand devices, PCS devices, personal digital assistants (PDAs), two-way radios (e.g., "walkie-talkies"), other types of user devices, and any suitable combination of the foregoing. As used herein, a "mobile user device" is a user device operative to send and/or receive wireless communications to/from one or more other network elements. For example, a mobile user device may include a transceiver to receive and transmit wireless communications.

A wireless network typically includes one or more wireless access points. As used herein, a "wireless access point" or "AP" is a network device that controls wireless access to a wireless network by one or more mobile user devices. Examples of wireless access points include: the Cisco Aironet 350 Series, 1000 Series, 1100 Series and 1200 Series; SerCom AP51bT; NetGear ProSafe 802.11b AP; Colubris InReach MultiService Access Points (MAP); and APs available on Broadcom chipsets, such as BCM4712 802.11b/54g™ Integrated Wireless AP/Router, whose OEMs include Apple, Belkin, Buffalo, Dell, eMachines, Gateway, HP, Linksys/Cisco, and Motorola.

Wireless communications between mobile user devices and wireless access points have inherent security risks not found in wire-line communications (e.g., on a network segment comprised solely of one or more electrical or optical wires or cables made of metal and/or optical fiber). That is, it is generally easier to control and limit access to communications transmitted on wire-line segments of a network than communications transmitted over wireless segments. For this reason, security technologies and standards such as, for example, Wire Equivalent Protection (WEP), Temporal Key Integrity Protocol (TKIP), Wi-Fi Protected Access (WPA), IEEE 802.1X (802.1X), and others have been developed specifically to improve security for wireless communications between mobile user devices and wireless access points.

Wireless Provisioning Services (WPS) is a technology that allows wireless network providers (e.g., Wi-Fi network providers) and others to send provisioning and configuration information to a mobile user device as it connects to the wireless network. WPS provides seamless and automatic provisioning and configuration of mobile user devices. As a user logs onto a wireless network, the network recognizes the user, automatically sets up the session, and bills the user's account. WPS provides automatic authentication and encryption in accordance with 802.1X.

For wireless networks that are not known to a mobile user device (i.e., wireless networks not previously discovered and recorded by the mobile user device), the user device often must exchange several communications with a wireless access point, in a sort of trial-and-error fashion, to determine whether the wireless network supports WPS and/or 802.1X. This trial-and-error technique is not an efficient use of wireless access point and wireless network resources.

Another limitation of most of today's wireless access points is that they allow only one service set identifier (SSID) to be broadcasted (e.g., advertised as part of a periodic 802.11 beacon) to mobile user devices. An SSID essentially serves as an identifier (e.g., a name) of a wireless network (e.g., WLAN). Such wireless access points often are capable of being configured with the definitions of multiple SSIDs, and to support the wireless networks identified by the SSIDs. However, because of physical limitations, such wireless access points are only capable of advertising one SSID, for example, within an 802.11 beacon. Thus, the other wireless networks, whose SSIDs are not advertised, remain hidden to mobile user devices. This inability to advertise multiple SSIDs is a problem for public Wi-Fi hotspot deployments, as hidden wireless networks cannot be discovered by mobile user devices.

One solution to this problem is adding additional wireless access points for each additional network. However, this solution becomes costly (from both an equipment acquisition and network management point of view), and is thus not a feasible option, for example, for wireless Internet service providers (WISPs).

Another solution, which is more of a long-term solution than the previously described solution, is configuring wireless access points with virtual wireless access point support; i.e., the ability to logically represent multiple wireless access points on a single network device. In fact, many independent hardware vendors (IHVs) that manufacture wireless access points (e.g., any of those listed above) plan to implement virtual wireless access points. However, deployment of these virtual wireless access points will require, in many cases, replacement of already-deployed infrastructures, which can be very costly, particularly for large hotspot deployments.

SUMMARY

The beginning portion of this Summary provides an illustrative context for aspects of the invention, in a simplified form. It is not intended to be used to determine the scope of the claimed subject matter, nor to identify key and/or essential features of the claimed subject matter. These and other aspects of the invention are described more fully below in the Detailed Description.

A wireless access point may be configured to advertise, to mobile user devices, multiple wireless networks available through the wireless access point. For example, SSIDs may be specified within an information element (IE) of a communication such as, for example, an 802.11 beacon, broadcasted to mobile user devices. Such an IE may utilize the capability provided by IEEE 802.11 to use additional and flexible numbers of information elements within a beacon. Accordingly, networks that would otherwise remain hidden due to limitations of known wireless access points are made visible to mobile user devices. Configuring a wireless access point to advertise multiple available wireless networks, for example, by firmware upgrades, may serve as a viable and cost-effective interim solution and/or alternative to replacing a wireless access point with a wireless access point configured to implement virtual wireless access points.

The information element within the broadcasted communication also may specify whether an identified wireless network (e.g., identified by SSID) is configured to provide wireless provisioning information (e.g., in accordance with WPS) and/or a particular type of wireless security (including authentication and/or encryption) such as, for example, 802.1X or WEP security, any of the other security technologies described herein, or any suitable combination of the foregoing. For example, such an information element may specify an SSID and indicate that the wireless network identified by the SSID supports WPS, which inherently provides support for 802.1X. Alternatively, such an information element may specify an SSID and indicate that the wireless network identified by the SSID does not provide support for WPS, but provides support for 802.1X. Providing support for 802.1X, but not for WPS, may be referred to herein as providing support for "legacy 802.1X." Further, such an information element may specify an SSID and indicate that neither WPS nor 802.1X is supported by the wireless network identified by the SSID. For example, the information element may specify that the wireless network is supported by WEP and/or another wireless security technology. Advertising such information may eliminate the need for mobile user devices to determine this information through trial-and-error techniques when attempting to connect to wireless networks through a wireless access point, thereby reducing the time it takes for a wireless user device to connect.

Wireless user devices may be configured to communicate the availability of multiple wireless networks to users, for example, in response to receiving a communication including an information element identifying the wireless networks. The user device may include a network interface card (NIC) or other component configured to interface with a wireless network (e.g., a WLAN NIC), for example, in accordance with WPA. A network interface component configured as such may be configured to pass all information elements (even information elements that the network interface component is not configured to support) to a wireless service component of the user device, for example, a wireless zero configuration service (WZC). The wireless service component may treat each wireless network identifier (e.g., SSID) included in the passed information element like an SSID identified using known techniques. The wireless service component may display an indication of the available networks to a user and enable the user to select to connect to a particular one of the networks.

A wireless access point configured in this manner may be beneficial when it is desired to provide different types of networks to support different types of customers such as, for example, customers with different security contexts (or no security). Accordingly, in some embodiments of the invention, one or more of the wireless networks available through a wireless access point, and communicated in a broadcast to multiple mobile user devices, have different security contexts.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

FIG. 2 is a block diagram illustrating an example of an information element that may be included in a communication transmitted from a wireless access point to one or more user devices, in accordance with some embodiments of the invention;

DETAILED DESCRIPTION

Although some embodiments described herein are described primarily in relation to transmitting an information element including network information within an 802.11 beacon, the invention is not so limited. The network information may be transmitted using any of a variety of means such as, for example, including an information element in another type of communication from a wireless access point to one or more mobile user devices. Further, although some embodiments of the invention described herein are described in relation to 802.1X security technology, these embodiments may be implemented using other security technologies as well such as, for example, WEP, TKIP, WPA, other security technologies, or any suitable combination of the foregoing.

The function and advantage of these and other embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

Examples

Figure 1:
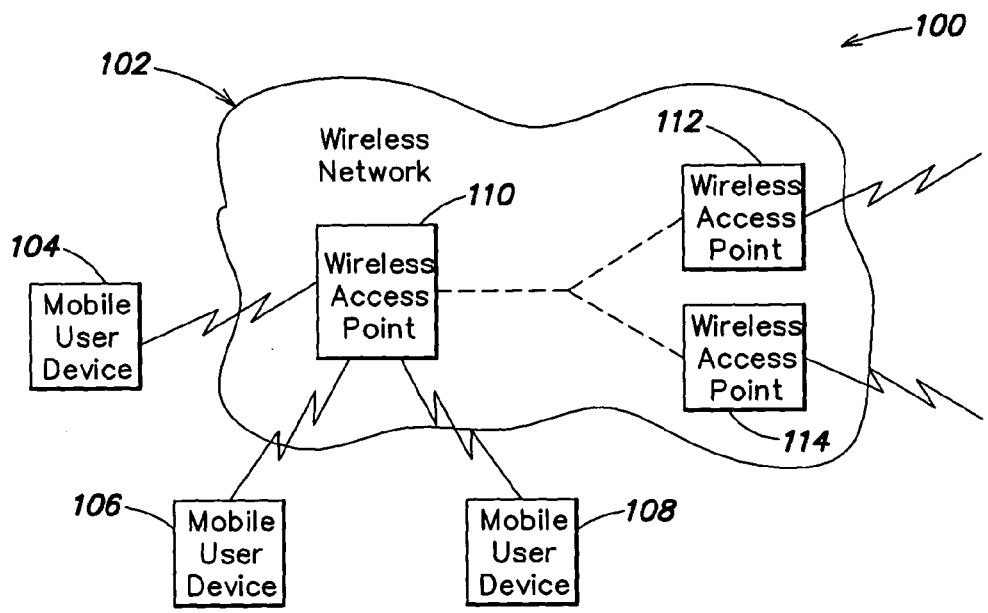
FIG. 1 is a block diagram illustrating an example of a communications network, in accordance with some embodiments of the invention.

FIG. 1 is a block diagram illustrating an example of a communications network 100, in accordance with some embodiments of the invention. Network 100 is merely an illustrative embodiment of a communications network, and is not intended to limit the scope of the invention. Any of numerous other implementations of such a network, for example, variations of system 100, are possible and are intended to fall within the scope of the invention.

Network 100 may be and/or include any of a variety of types of networks including, but not limited to, a local area network (LAN), metropolitan area network (MAN), a wide-area network (WAN), a wireless network (e.g., any of those described above), another type of network, or any suitable combination of the foregoing.

Network 100 may include: wireless network 100; one or more mobile user devices 104, 106, and 108; one or more wireless access points 110, 112 and 114; other network elements; or any suitable combination of the foregoing. It should be appreciated that, although FIG. 1 illustrates only three mobile user devices and three wireless access points, network 100 may include any number (more or less) of mobile user devices and wireless access points; as few as one each or up to as many as tens, hundreds or even thousands each.

Each wireless access point may be configured to control wireless access to the wireless network 102 (and one or more networks configured thereon) by one or more mobile user devices. For example, wireless access point 110 may be configured to control wireless access to wireless network 102 and other networks by mobile user devices 104, 106 and 108.

One or more of wireless access points 110, 112 and 114 may be configured to transmit to one or more mobile user devices a communication specifying a plurality of wireless networks available to one or more user devices through the wireless access point. For example, one or more of these wireless access points may be configured to transmit a beacon communication in accordance with 802.11 technology. A standard 802.11 beacon specifies a single wireless network, which is provided in a particular information element of the beacon. In some embodiments of the invention, one or more other wireless networks available through a wireless access point (and defined on the access point) are specified in another information element included within the 802.11 beacon. Further, for each of these one or more wireless networks, the information element may specify whether the wireless network provides wireless provisioning information and/or whether the wireless network provides security (e.g., authentication and/or encryption) in accordance with a particular wireless security technology such as, for example, 802.1X or WEP. Each wireless network specified in the communication may be specified by a network identifier such as, for example, an SSID.

For example, such an information element may specify an SSID and indicate that the wireless network identified by the SSID supports WPS, which inherently provides support for 802.1X. Alternatively, such an information element may specify an SSID and indicate that the wireless network identified by the SSID does not provide support for WPS, but provides support for 802.1X. Providing support for 802.1X, but not for WPS, may be referred to herein as providing support for "legacy 802.1X." Further, such an information element may specify an SSID and indicate that neither WPS nor 802.1X is supported by the wireless network identified by the SSID. For example, the information element may specify that the wireless network is supported by WEP and/or another wireless security technology.

In some embodiments of the invention, a wireless access point (e.g., any of access points 110, 112 and 114) may be configured to send multiple beacon communications in order to communicate all of the wireless networks available through the wireless access point. For example, the information element included within the one or more beacons may be configured to have a certain length, and multiple beacons may be employed in order to accommodate all of the wireless networks available. Further, in some embodiments of the invention, the information element may be used to simply convey whether a single wireless network available through a wireless access point provides wireless provisioning information (e.g., is WPS-enabled) and/or provides security in accordance with a particular wireless security technology (e.g., 802.1X or WEP). As described above, one or more of these wireless networks may be specified using an SSID, including one or more hidden SSIDs.

Digressing briefly from FIG. 1, FIG. 2 is a block diagram illustrating an example of an information element 200 that may be included in a communication transmitted from a wireless access point to one or more user devices, in accordance with some embodiments of the invention. It should be appreciated that information element 200 is merely an illustrative embodiment of an information element that may be included in a communication transmitted from a wireless access point to one or more user devices, and is not intended to limit the scope of the invention. Other implementations of such an information element such as, for example, variations of information element 200, are possible and are intended to fall within the scope of the invention. Throughout the description of FIGS. 2 and 2B, and elsewhere in this document, an information element that specifies one or more wireless networks available to one or more user devices through the wireless access point, and/or that specifies whether the wireless network provides wireless provisioning information and/or whether the wireless network provides security in accordance with a particular technology, may be referred to as a "WPS information element" However, it should be appreciated that this information element is not limited to providing information limited to WPS.

Information element 200 may be limited to particular length such as, for example, a 256 octet length. In such embodiments, several information elements 200 may be required to advertise all of the supported wireless networks (e.g., specified by SSIDs) on a wireless access point. However, SSID capabilities may be allocated to the hidden SSID elements in a manner to minimize the total number of hidden SSID elements required. As used herein, a "hidden SSID" is an SSID available through a wireless access point that would not be included in a standard 802.11 beacon, prior to the invention described herein. That is, it would not be the sole SSID transmitted in a standard 802.11 beacon, prior to the invention described herein.

The length field 202 may report the length of information element 200, excluding the element ID and length fields; that is, it may specify the length of the information element in octets commencing with the organizational unique identifier (OUI), which may identify the wireless access point.

Information element 200 may indicate zero occurrences of the hidden SSIDs, for example, if only a single SSID is available through a wireless access point, in which case the information element 200 may be used to convey support for WPS (which inherently supports 802.1X) and/or legacy 802.1X (i.e., 802.1X without support for WPS) for the single available wireless network. If the SSID-Count field 204 is zero, then fields 205 and 207 (described below) may be omitted from information element 200.

If multiple hidden SSIDs are indicated, each hidden SSID may generate an entry in the information element. When multiple hidden SSIDs are available, the indication of which spans more than one information element 200, multiple information elements 200 may be used, and the SSID-count field 204 may reflect the number of hidden SSIDs specified in a respective information element 200 in which it is included.

Primary SSID field 201 may specify a primary (i.e., non-hidden) SSID available though a wireless access point. The SSID Extended Capability field 203 may specify whether legacy 802.1X or WPS is supported by the primary SSID indicated in field 201. The field may be a single octet mask where the bit representation may indicate legacy 802.1X capability and/or WPS capability as shown in Table 1 below.

TABLE 1

| Extended Capability Type | Bit representation Value |
|---|---|
| Legacy 802.1X | 1 << 0 |
| WPS | 1 << 1 |

(all other bits are reserved - set to zero)

For each hidden SSID specified in information element 200 (e.g., specified in blocks 205 and 207), an SSID Extended capability field (e.g., 206 and 208) may indicate legacy 802.1X capability and/or WPS capability, for example, in a manner at least similar to (e.g., the same as) that shown in Table 1. Information element 200 also may include one or more fields for specifying whether the primary and/or one or more hidden networks provides support for one or more wireless security technologies such as, for example, WEP or any of the other wireless security technologies described herein.

Returning to FIG. 1, in some embodiments, the above-described communication transmitted from a wireless access point to one or more mobile user devices may be transmitted to the one or more mobile user devices irrespective of whether a communication has been previously received from any of the one or more mobile user devices. For example, the communication may be transmitted without having first received a probe request frame in accordance with 802.11 from any of the mobile user devices and/or without receiving any communication to establish a connection from any of the mobile user devices.

Figure 3:
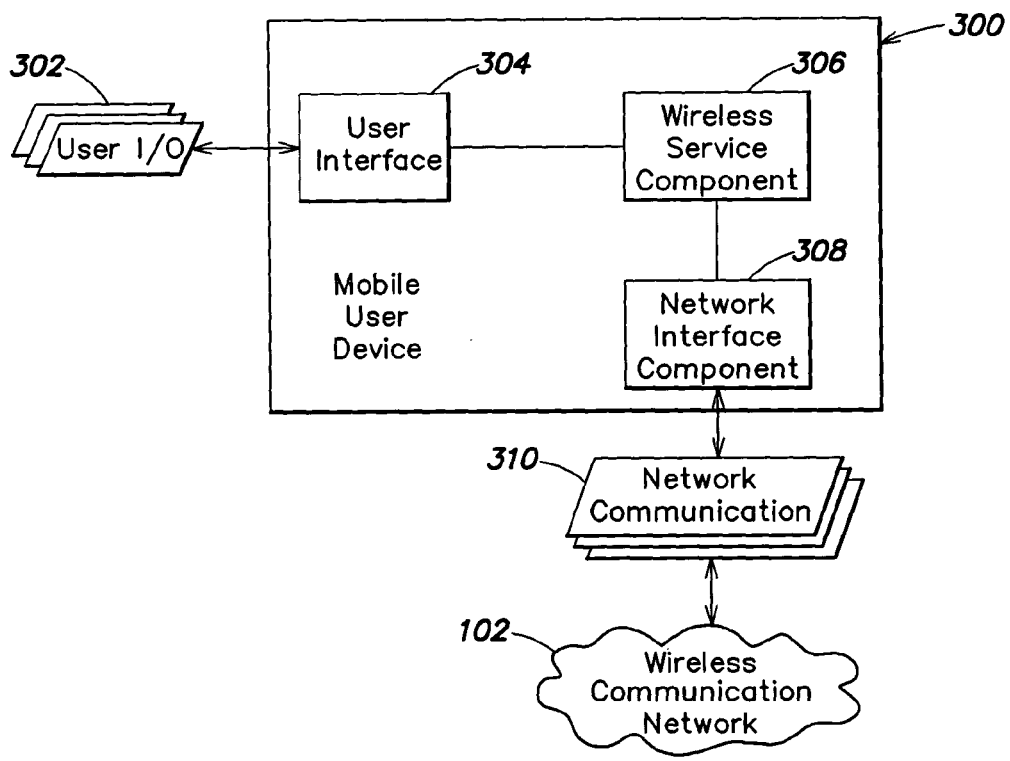
FIG. 3 is an example of a mobile user device according to some embodiments of this invention.

FIG. 3 is an example of a mobile user device 300 according to some embodiments of this invention. Mobile user device 300 is merely an illustrative example of a mobile user device, and is not intended to limit the scope of the invention. Any of numerous other implementations of a mobile user device, for example, variations of device 300, are possible and are intended to fall within the scope of the invention.

Mobile user devices may include: a network interface component 308; a wireless service component 306; user interface 304; other components; and any combination of the foregoing. Network interface component 308 may be any of a variety of types of network interface components such as, for example, a WLAN NIC configured to interface with a wireless network, for example, in accordance with WPA. Component 308 may be configured to transmit and receive network communications 310 to/from wireless communication network 102. Component 308 may be configured to pass all information elements received within a network communication 310 to the wireless service component 306, for example, as described below in relation to Act 610 in timing diagrams 600 and 700 of FIGS. 6 and 7.

For example, network interface component 308 may be configured to receive a communication 310 of the type described above in relation to FIGS. 1 and 2.

Wireless service component 306 may be configured to communicate the plurality of available wireless networks specified in the communication to a user of the mobile user device 300. For example, component 306 may be configured to control user interface 304 to display network identifiers (e.g., SSIDs) as user output 302. The user then may select one of the communicated wireless networks, and wireless service component 306 may be configured to control establishing a connection between the mobile user device and the selected network (e.g., through the network interface component 308, network 102 and a wireless access point).

In some embodiments, the mobile user device 300 may already have knowledge of one or more of the wireless networks. That is, it may already have information (e.g., including provisioning information) about one or more of the specified wireless networks. If two or more of the specified wireless networks are known to the mobile user device, then the wireless service component 306 may be configured to communication to the user that these two networks are known and allow the user to select one of the networks. Alternatively, component 306 may be configured (e.g., with business rules or other logic) to select one of the known networks. Further, if only one specified wireless network is known to the user device, component 306 may be configured to control establishing connection to the network through a wireless access point.

System 100 and/or mobile network device 300, and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of system 100 and/or mobile network device 300, may reside on a single device (e.g., a computer), or one or more components may reside on separate, discrete devices. Further, each component may be distributed across multiple devices, and one or more of the devices may be interconnected.

Further, on each of the one or more devices that include one or more components of system 100 and/or mobile network device 300, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. System 100 and/or mobile network device 300, and components thereof, may be implemented using a computer system such as that described below in relation to FIGS. 8 and 9.

Figure 4:
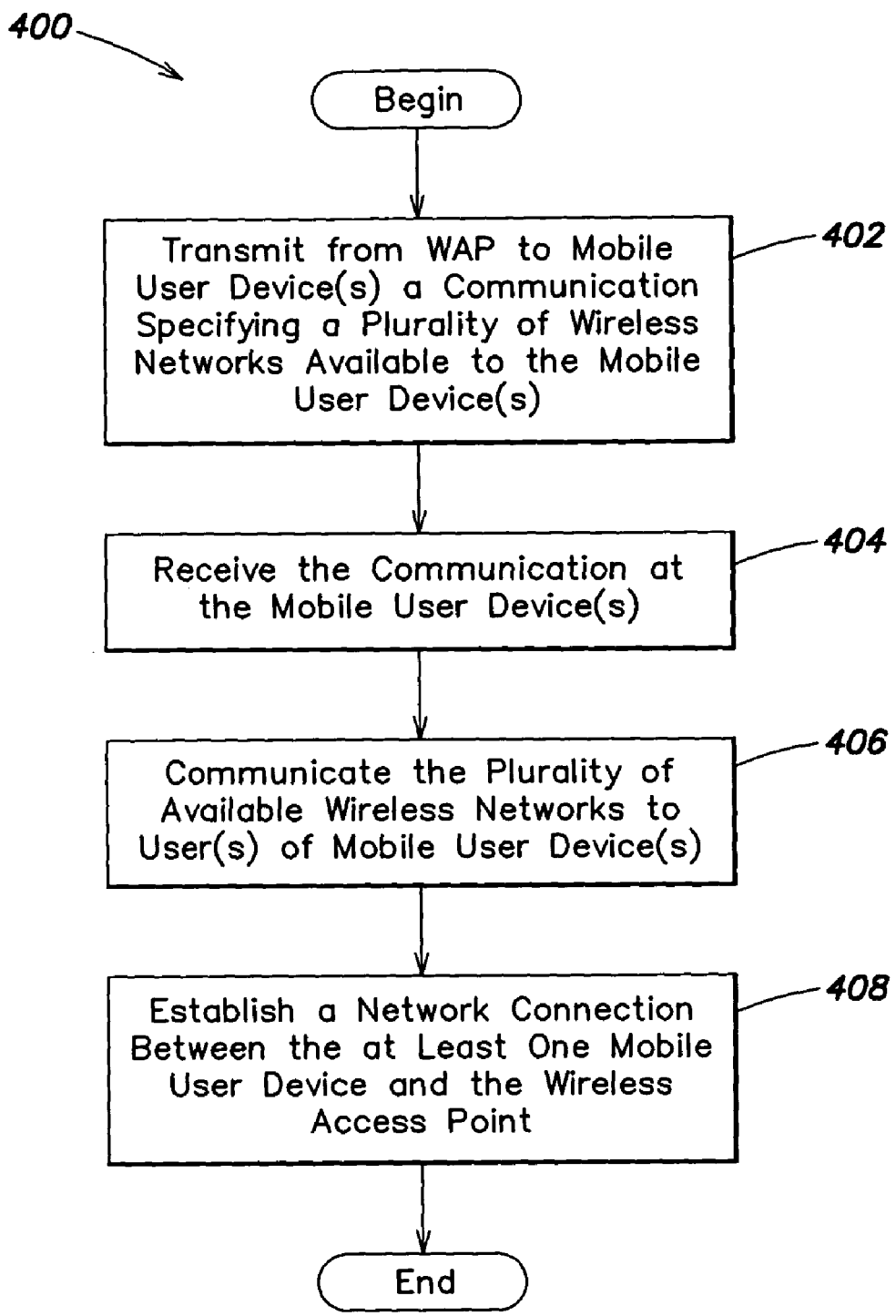
FIG. 4 is flowchart illustrating an example of a method of communicating between a wireless access point of a communications network and one or more mobile user devices, according to some embodiments of the invention.

FIG. 4 is flowchart illustrating an example of a method 400 of communicating between a wireless access point of a communications network and one or more mobile user devices, according to some embodiments of the invention. Method 400 is merely an illustrative embodiment of a method of communicating between a wireless access point of a communications network and one or more mobile user devices, and is not intended to limit the scope of the invention. Any of various other implementations of such a method, for example, variations of method 400, are possible and are intended to fall within the scope of the invention. Method 400 and/or one or more acts thereof may be implemented in accordance with one or more communication protocol standards such as, for example, an 802.11 standard.

In Act 402, a communication specifying a plurality of wireless networks available to one or more mobile user devices may be transmitted from a wireless access point to the one or more user devices, for example, as described above in relation to FIGS. 1-3. Further, the communication also may include an indication of whether at least one of the specified wireless networks provides wireless provisioning information (e.g., in accordance with WPS) and/or whether at least one of the specified wireless networks provides security in accordance with a particular technology such as, for example, 802.1X.

In Act 404, the communication may be received at the one or more user devices, and the plurality of available wireless networks may be communicated to the user of each of the one or more mobile user devices in Act 406. Acts 404 and 406 may be performed as described above in relation to FIGS. 1-3. In Act 408, a network connection may be established between the at least one mobile user device and the wireless access point, for example, as described above in relation to FIGS. 1-3.

Method 400 may include additional acts. Further, the order of the acts performed as part of method 400 is not limited to the order illustrated in FIG. 4, as the acts may be performed in other orders and/or one or more of the acts may be performed in series or in parallel, as least partially.

Figure 5:
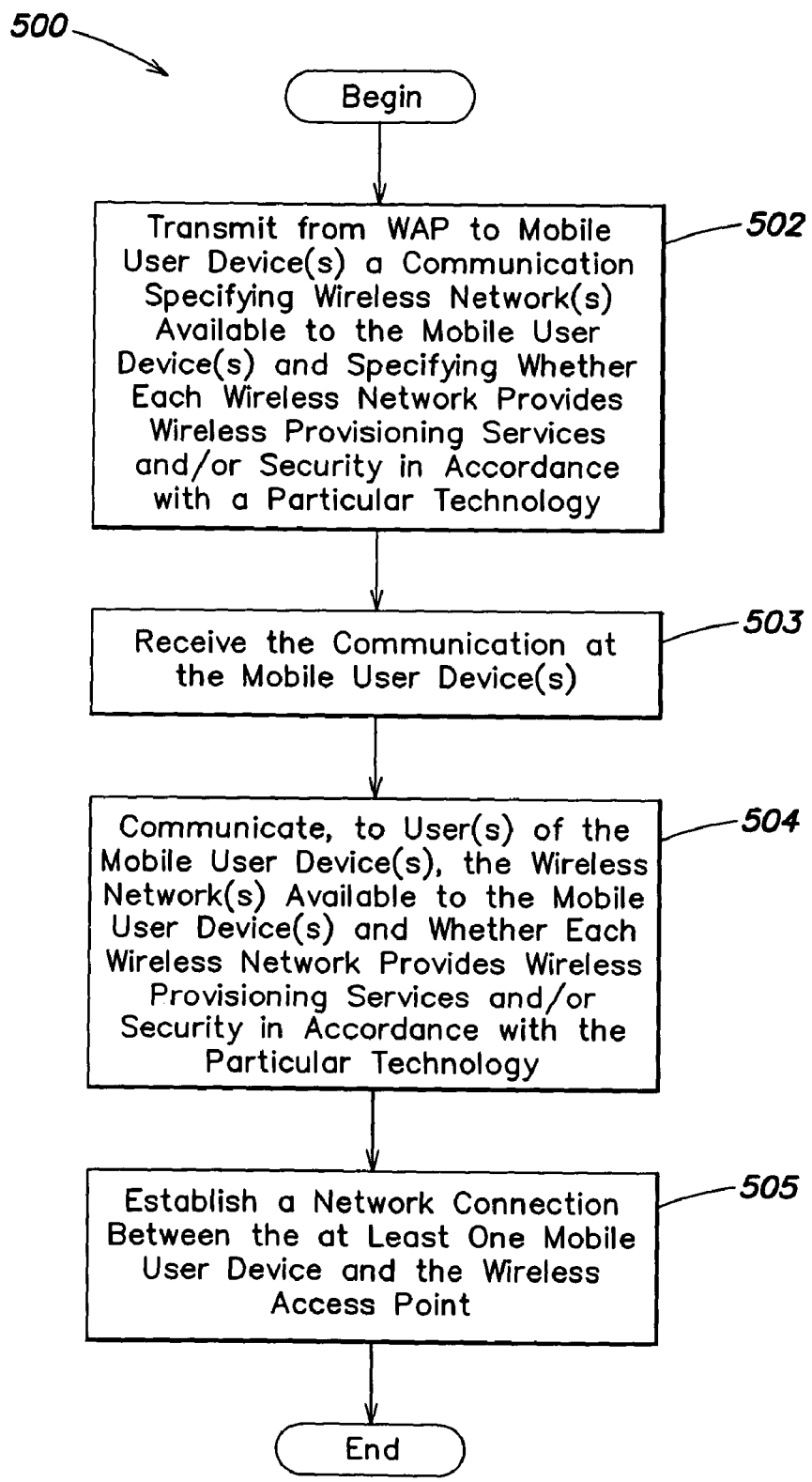
FIG. 5 is a flow chart illustrating an example of a method of communicating between a wireless access point of a communications network and at least one mobile user device, according to some embodiments of the invention.

FIG. 5 is a flow chart illustrating an example of a method 500 of communicating between a wireless access point of a communications network and at least one mobile user device, according to some embodiments of the invention. Method 500 is merely an illustrative embodiment of a method of communicating between a wireless access point and at least one mobile user device, and is not intended to limit the scope of the invention. Any of numerous other implementations of such a method, for example, variations of method 500, are possible and are intended to fall within the scope of the invention. Method 500 and/or one or more acts thereof may be implemented in accordance with one or more communication protocol standards such as, for example, an 802.11 standard.

In Act 502, a communication is transmitted from a wireless access point to the at least one mobile user device. The communication may specify one or more wireless networks available to the at least one mobile user device and specify whether each wireless network provides wireless provisioning services and/or security in accordance with a particular technology such as, for example, 802.1X technology. This communication may be transmitted irrespective of whether a communication has previously been received from any of the at least one mobile user device. Act 502 may be performed in accordance with the description of transmitting such a communication described above in relation to FIGS. 1-3.

In Act 503, the communication may be received at the at least one mobile user device. The one or more wireless networks available to the at least one mobile user device and whether each wireless network provides wireless provisioning services (e.g., WPS) and/or security in according with a particular technology may be communicated to the at least one user of the one or more mobile user devices in Act 504. In Act 505, a network connection may be established between the at least one mobile user device and the wireless access point. Acts 503-505 may be performed in a manner at least similar to as described above in relation to FIGS. 1-3.

Method 500 may include additional acts. Further, the order of the acts performed as part of method 500 is not limited to the order illustrated in FIG. 5, as the acts may be performed in other orders and/or one or more of the acts may be performed in series or in parallel, at least partially.

Figure 6:
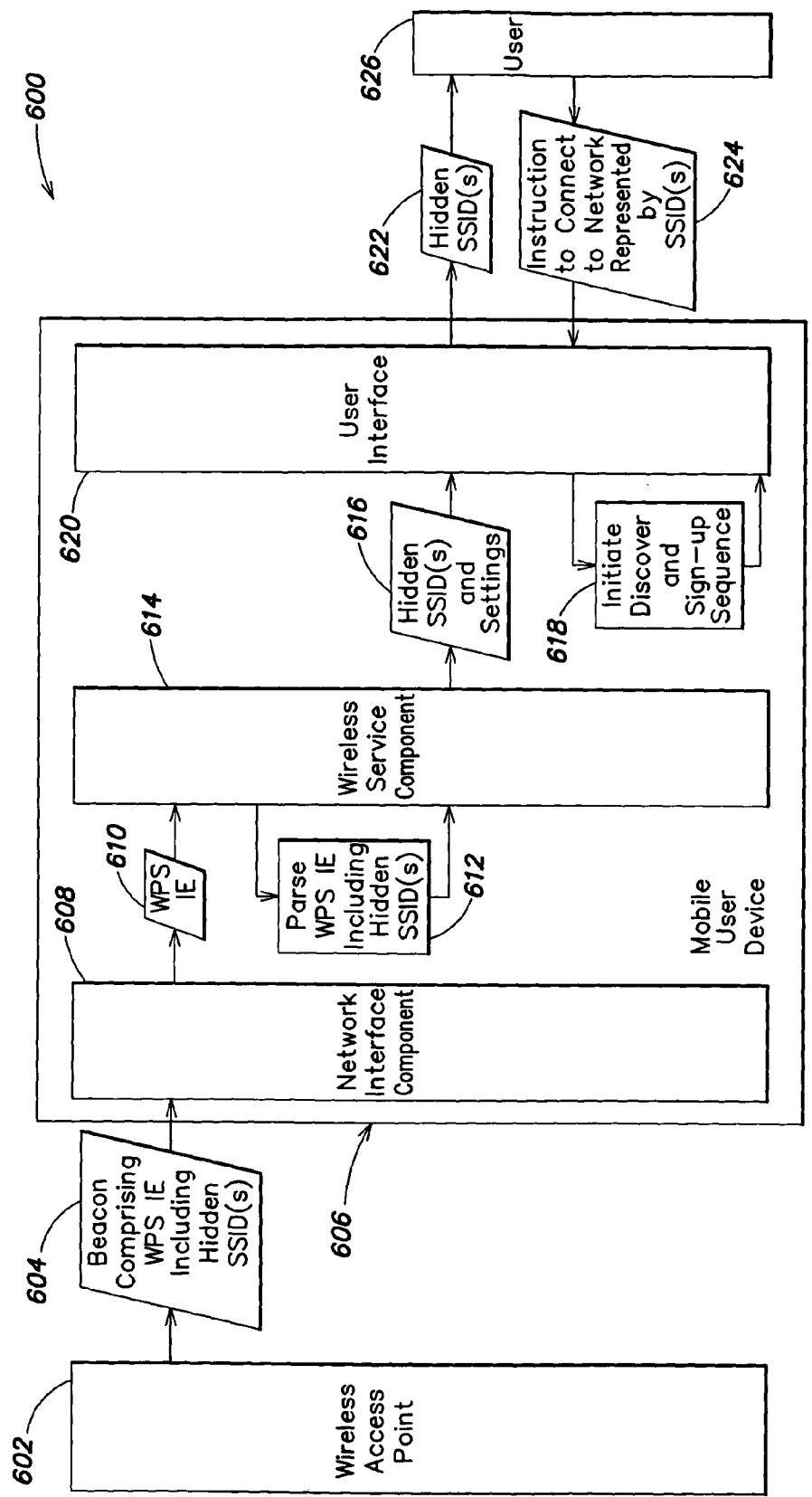
FIG. 6 is a timing diagram illustrating an example of a method of communicating to a mobile user device a hidden SSID previously unknown to the mobile user device, in accordance with some embodiments of the invention.

FIG. 6 is a timing diagram 600 illustrating an example of a method of communicating to a mobile user device 606 a hidden SSID previously unknown to the mobile user device, in accordance with some embodiments of the invention. The method depicted in timing diagram 600 is merely an illustrative embodiment of a method of communicating to a mobile user device a hidden SSID previously unknown to the mobile user device, and is not intended to limit the scope of the invention. Any other variety of other implementations of such a method, for example, variations of the depicted method, are possible and are intended to fall within the scope of the invention. For example, a network identifier other than an SSID may be used. The method depicted in timing diagram 600 and/or one or more acts thereof may be implemented in accordance with one or more communication protocol standards such as, for example, an 802.11 standard.

In Act 604, a beacon (e.g., an 802.11 beacon) comprising a WPS information element including a hidden SSID may be transmitted from wireless access point 602 to the network interface component 608 of mobile user device 606. The network interface component may be any of a variety of types of network interface components such as, for example, a WLAN NIC.

In Act 610, network interface component 608 may pass the WPS information element to a wireless service component 614. The wireless service component may be any of a variety of types of wireless service components such as, for example, a wireless zero configuration service (WZC). Component 614 may be configured to parse the WPS IE to determine the one or more hidden SSIDs.

In Act 616, the wireless service component 614 may pass the one or more hidden SSIDs and associated settings to the user interface 620, which may display the one or more hidden SSIDs in Act 622 to user 626. In response, user interface 620 may receive an instruction to connect to a network represented by one of the SSID(s). The user interface 620 then may initiate a discover and signup sequence with respect to the selected network. The discovery process may include the mobile user device 606 determining if the selected network supports WPS, for example, from the WPS information element, or by trial using known techniques. This discovery process may include authenticating the user using 802.1X (e.g., using the PEAP-MSCHAPv2 authentication protocol for authentication over a wireless network) or other security technologies. If authentication succeeds, the user may be enabled to sign-up, for example, using a sign-up wizard that guides the user through the signup process.

The method depicted in timing diagram 600 may include additional acts, and one or more of the depicted acts may be performed in parallel (at least partially) or in orders other than those depicted in FIG. 6.

Figure 7:
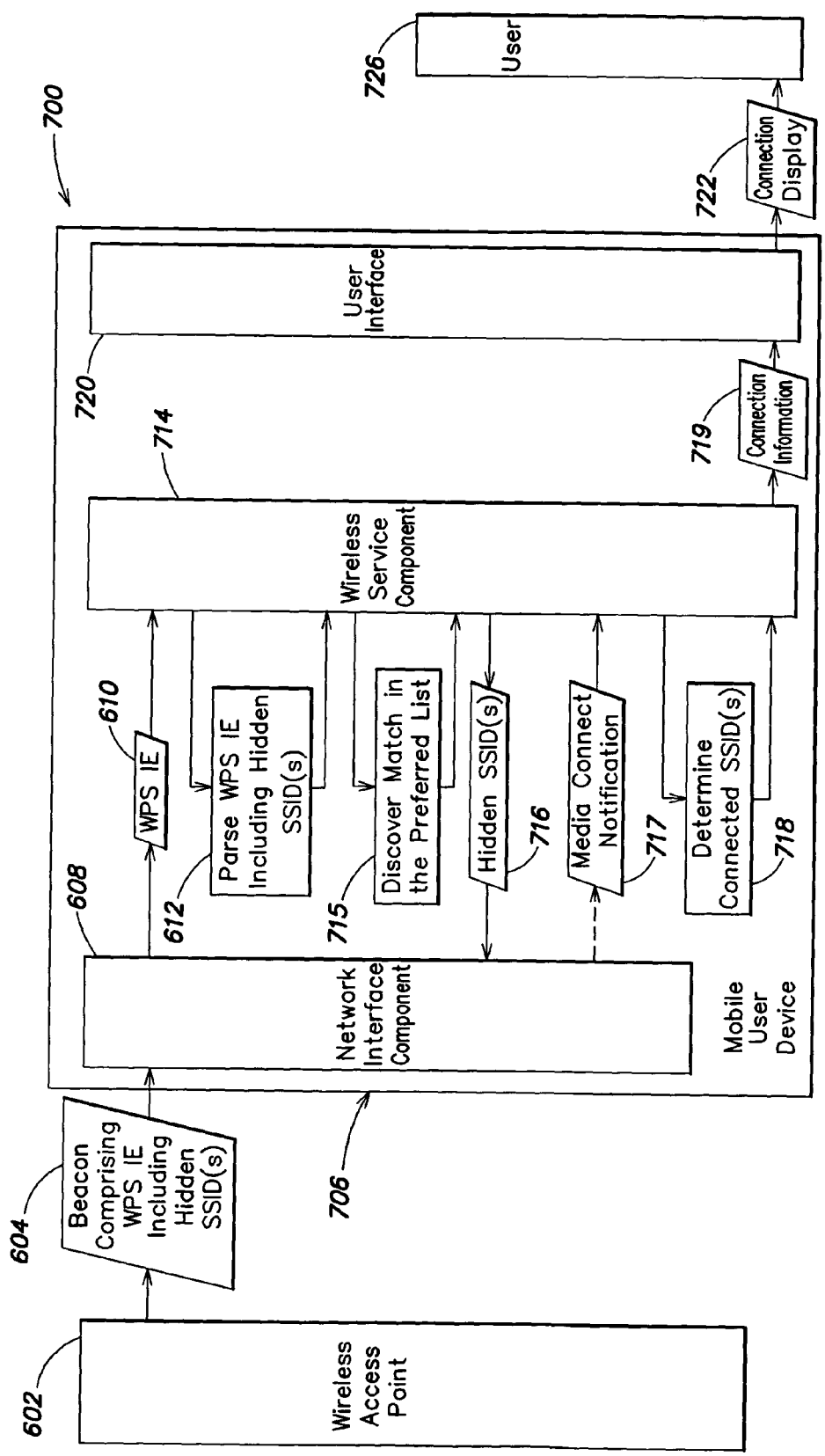
FIG. 7 is a time diagram illustrating an example of a method of communicating to a mobile user device one or more hidden SSIDs representing wireless networks already known by the mobile user device, according to some embodiments of the invention.

FIG. 7 is a timing diagram 700 illustrating an example of a method of communicating, from a wireless access point, one or more hidden SSIDs representing wireless networks already known by a mobile user device, according to some embodiments of the invention. The method depicted in timing diagram 700 is merely an illustrative embodiment of a method of communicating, from a wireless access point, one or more hidden SSIDs representing wireless networks already known by a mobile user device, and is not intended to limit the scope of the invention. Various other implementations of such a method, for example, variations of the method depicted in timing diagram 700 are possible, and are intended to fall within the scope of the invention. The method depicted in timing diagram 700 and/or one or more acts thereof may be implemented in accordance with one or more communication protocol standards such as, for example, an 802.11 standard.

Acts 604-612 of the method depicted in timing diagram 700 may be performed as described above in relation to timing diagram 600. Further, mobile user device 706 and mobile user device 606 may be a same mobile user device, and wireless service component 714 may be the same wireless service component as described above in relation to 614.

In Act 715, a match to one or more of the hidden SSIDs in a preferred list may be discovered. For example, the hidden SSID may be an SSID representing a wireless network to which the mobile user device 706 has been previously connected, and the mobile user device 706 may have been previously configured to communicate with the wireless network.

In Act 716, wireless service component 714 may plumb (i.e., pass) the one or more hidden SSIDs to the network interface component 608.

In Act 717, wireless service component 714 may receive a media connect notification 717, and determine the one or more connected SSIDs in Act 718. The connection information 719 is then sent to the user interface 720, which can display or otherwise communicate the connection to user 726 in Act 722. User interface 720 and user 726 may be the same as user interface 620 and user 626, respectively.

Methods 400 and 500 and the methods depicted in timing diagrams 600 and 700, acts thereof, and various embodiments and variations of these methods and these acts, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., methods 400 and 500, or the methods depicted in timing diagrams 600 and 700, or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 200, 800 and 900 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described in relation to FIGS. 1, 2, 8 and 9, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

Figure 8:
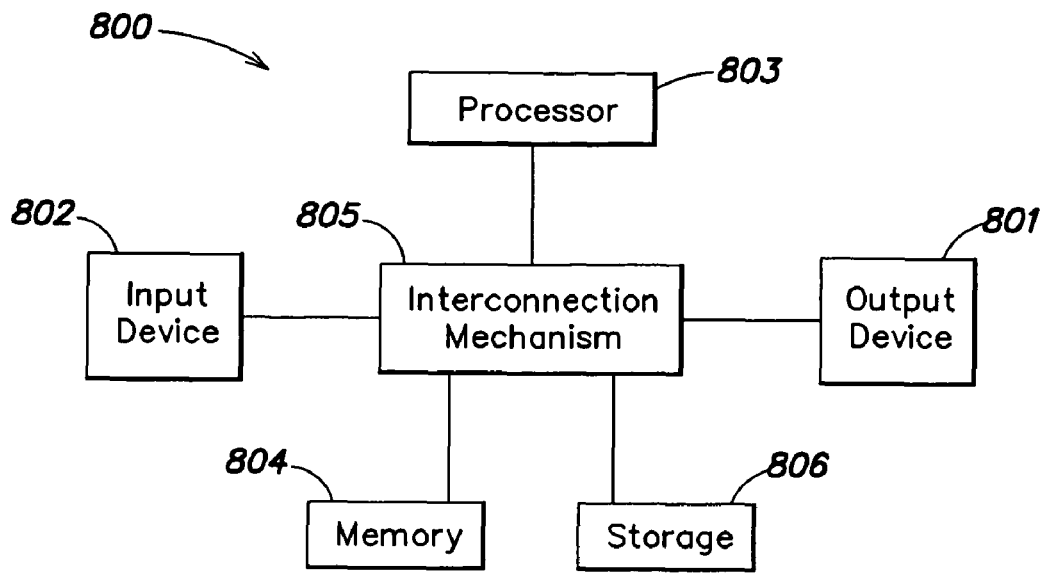
FIG. 8 is a block diagram illustrating an example of a computer system on which some embodiments of the invention may be implemented.

For example, various aspects of the invention may be implemented as specialized software executing in a general-purpose computer system 800 such as that shown in FIG. 8. The computer system 800 may include a processor 803 connected to one or more memory devices 804, such as a disk drive, memory, or other device for storing data. Memory 804 is typically used for storing programs and data during operation of the computer system 800. Components of computer system 800 may be coupled by an interconnection mechanism 805, which may include one or more busses (e.g., between components that are integrated within a same machine) and/or a network (e.g., between components that reside on separate discrete machines). The interconnection mechanism 805 enables communications (e.g., data, instructions) to be exchanged between system components of system 800. Computer system 800 also includes one or more input devices 802, for example, a keyboard, mouse, trackball, microphone, touch screen, and one or more output devices 801, for example, a printing device, display screen, speaker. In addition, computer system 800 may contain one or more interfaces (not shown) that connect computer system 800 to a communication network (in addition or as an alternative to the interconnection mechanism 805.

Figure 9:
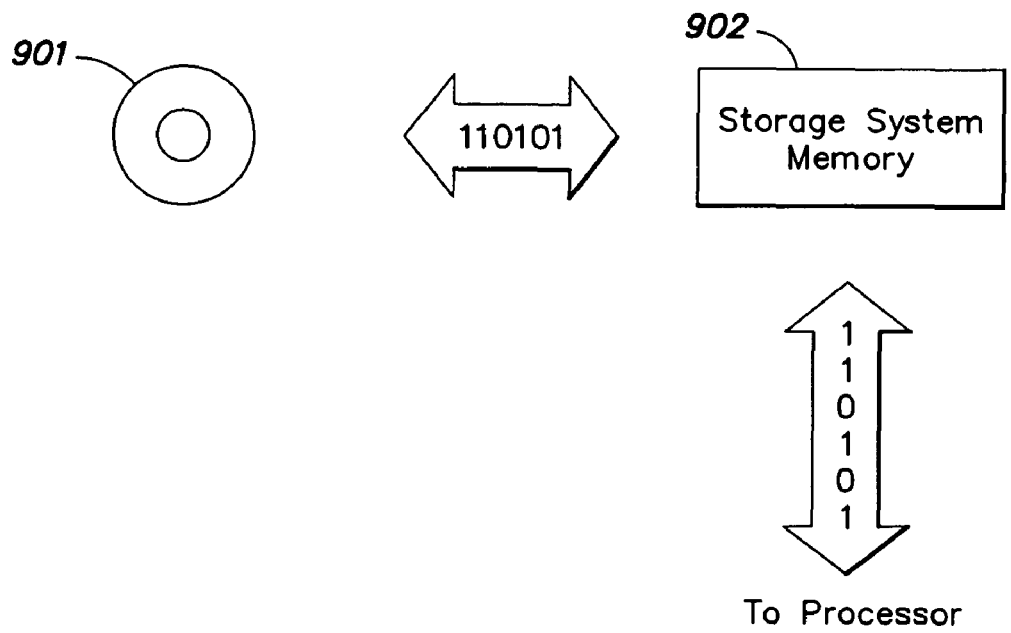
FIG. 9 is a block diagram illustrating an example of a storage system that may be used as part of the computer system to implement some embodiments of the invention.

The storage system 806, shown in greater detail in FIG. 9, typically includes a computer readable and writeable nonvolatile recording medium 901 in which signals are stored that define a program to be executed by the processor or information stored on or in the medium 901 to be processed by the program. The medium may, for example, be a disk or flash memory. Typically, in operation, the processor causes data to be read from the nonvolatile recording medium 901 into another memory 902 that allows for faster access to the information by the processor than does the medium 901. This memory 902 is typically a volatile, random access memory such as a dynamic random access memory (DRAM) or static memory (SRAM). It may be located in storage system 806, as shown, or in memory system 804, not shown. The processor 803 generally manipulates the data within the integrated circuit memory 804, 902 and then copies the data to the medium 901 after processing is completed. A variety of mechanisms are known for managing data movement between the medium 901 and the integrated circuit memory element 804, 902, and the invention is not limited thereto. The invention is not limited to a particular memory system 804 or storage system 806.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 800 is shown by way of example as one type of computer system upon which various aspects of the invention may be practiced, it should be appreciated that aspects of the invention are not limited to being implemented on the computer system as shown in FIG. 8. Various aspects of the invention may be practiced on one or more computers having a different architecture or components that that shown in FIG. 8.

Computer system 800 may be a general-purpose computer system that is programmable using a high-level computer programming language. Computer system 800 also may be implemented using specially-programmed, special-purpose hardware. In computer system 800, processor 803 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A communication protocol for communicating between a wireless access point of a communications network and a mobile user device, the protocol comprising acts, performed by the mobile user device, of:
    (A) prior to the mobile user device attempting to establish a connection to the wireless access point, receiving a single beacon communication from the wireless access point communicating the availability of multiple wireless networks through the wireless access point, the single beacon communication comprising:
    a first information element specifying a service set identifier for a first wireless network of the multiple wireless networks, whether the first wireless network provides wireless provisioning information, and whether the first wireless network provides security in accordance with a particular wireless security technology; and
    a second information element specifying a service set identifier for each of one or more other wireless networks of the multiple wireless networks, whether each of the one or more other wireless networks provides wireless provisioning information, and whether each of the one or more other wireless networks provides security in accordance with a particular wireless security technology; and
    (B) using at least the information in the single beacon communication specifying whether the first wireless network and the one or more other wireless networks provides wireless provisioning information and whether the first wireless network and the one or more other wireless networks provides security in accordance with a particular wireless security technology to automatically, without user intervention, select one of the multiple wireless networks with which to connect.

2. The communication protocol of claim 1, wherein the act (A) comprises specifying, within the single beacon communication, whether the first wireless network and the one or more other wireless networks provides wireless provisioning information in accordance with Wireless Provisioning Services.

3. The communication protocol of claim 1, wherein the single beacon communication complies with an IEEE 802.11 standard.

4. The communication protocol of claim 1, further comprising an act, performed subsequent to the act (B), of establishing a network connection to the one wireless network selected in (B).

5. A system for communicating on a communications network, the system comprising:
    a wireless access point operative to transmit a single beacon communication, to at least one mobile user device, communicating the availability of multiple wireless networks through the wireless access point, the single beacon communication comprising:
    a first information element specifying a service set identifier for a first wireless network of the multiple wireless networks, whether the first wireless network provides wireless provisioning information, and whether the first wireless network provides security in accordance with a particular wireless security technology; and
    a second information element specifying a service set identifier for each of one or more other wireless networks of the multiple wireless networks, whether each of the one or more other wireless networks provides wireless provisioning information, and whether each of the one or more other wireless networks provides security in accordance with a particular wireless security technology;
    wherein the wireless access point is further operative to connect a mobile user device that receives the single beacon communication to a selected one of the multiple wireless networks, the one wireless network being selected automatically, without user intervention, on a basis of at least the information in the single beacon communication specifying whether the first wireless network and the one or more other wireless networks provides wireless provisioning information and whether the first wireless network and the one or more other wireless networks provides security in accordance with a particular wireless security technology.

6. The system of claim 5, wherein the wireless access point is operative to specify, within the single beacon communication, whether the first wireless network and the one or more other wireless networks provides wireless provisioning information in accordance with Wireless Provisioning Services.

7. The system of claim 5, wherein the single beacon communication complies with an IEEE 802.11 standard.

* * * * *